(12) United States Patent
Cho et al.

(10) Patent No.: US 10,730,509 B2
(45) Date of Patent: Aug. 4, 2020

(54) FAIL-SAFE METHOD FOR PARALLEL HYBRID ELECTRIC VEHICLE

(71) Applicants: HYUNDAI MOTOR COMPANY, Seoul (KR); KIA MOTORS CORPORATION, Seoul (KR)

(72) Inventors: Jin Kuk Cho, Goyang-si (KR); Ji Hyun Park, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 191 days.

(21) Appl. No.: 16/042,867

(22) Filed: Jul. 23, 2018

(65) Prior Publication Data

US 2019/0202439 A1    Jul. 4, 2019

(30) Foreign Application Priority Data

Dec. 28, 2017 (KR) .................. 10-2017-0182620

(51) Int. Cl.
*B60W 20/50* (2016.01)
*B60K 6/48* (2007.10)
*B60K 6/40* (2007.10)
*B60W 50/00* (2006.01)
*F16H 61/02* (2006.01)

(52) U.S. Cl.
CPC ............... *B60W 20/50* (2013.01); *B60K 6/40* (2013.01); *B60K 6/48* (2013.01); *B60W 50/0098* (2013.01); *B60W 2050/0026* (2013.01); *B60Y 2200/92* (2013.01); *F16H 61/0213* (2013.01); *F16H 2061/0227* (2013.01)

(58) Field of Classification Search
None
See application file for complete search history.

(56) References Cited

U.S. PATENT DOCUMENTS

| | | | |
|---|---|---|---|
| 6,098,733 A * | 8/2000 | Ibaraki | B60K 6/543 180/65.28 |
| 8,010,264 B2 * | 8/2011 | Ogata | B60K 6/48 701/55 |
| 9,254,739 B2 * | 2/2016 | Uchida | B60K 6/42 |
| 2007/0219045 A1 * | 9/2007 | Ogata | B60K 6/48 477/3 |

* cited by examiner

*Primary Examiner* — Dirk Wright
(74) *Attorney, Agent, or Firm* — Morgan, Lewis & Bockius LLP

(57) ABSTRACT

A fail-safe method for a parallel hybrid electric vehicle, having a motor connected between an engine and a transmission, and an engine clutch connected between the engine and the motor, includes: operating the engine using a starter and engaging the engine clutch; switching a first gearing map, which determines a change in a gear ratio of the transmission depending on a throttle vale opening rate regulated by an accelerator pedal and a vehicle speed obtained, to a second gearing map, which allows the gear ratio to change at a higher vehicle speed than that before the motor system failure occurs; and assisting a driving power of a first battery consumed by a low voltage DC-DC converter (LDC) with a counter electromotive power of the motor generated during operating of the engine in an engaged state of the engine clutch.

8 Claims, 3 Drawing Sheets

[FIG.1]
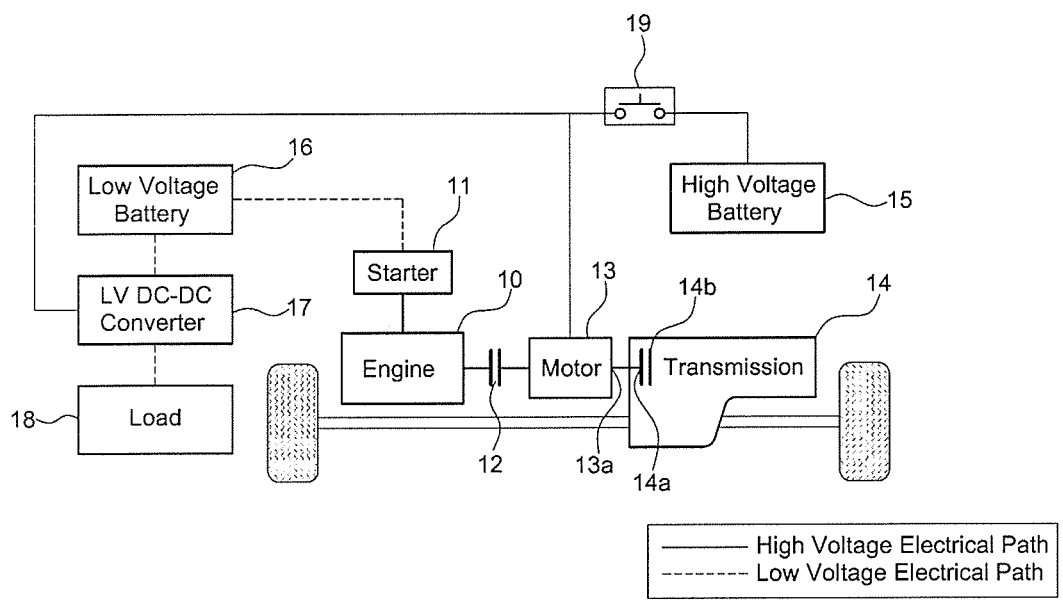

[FIG.2]
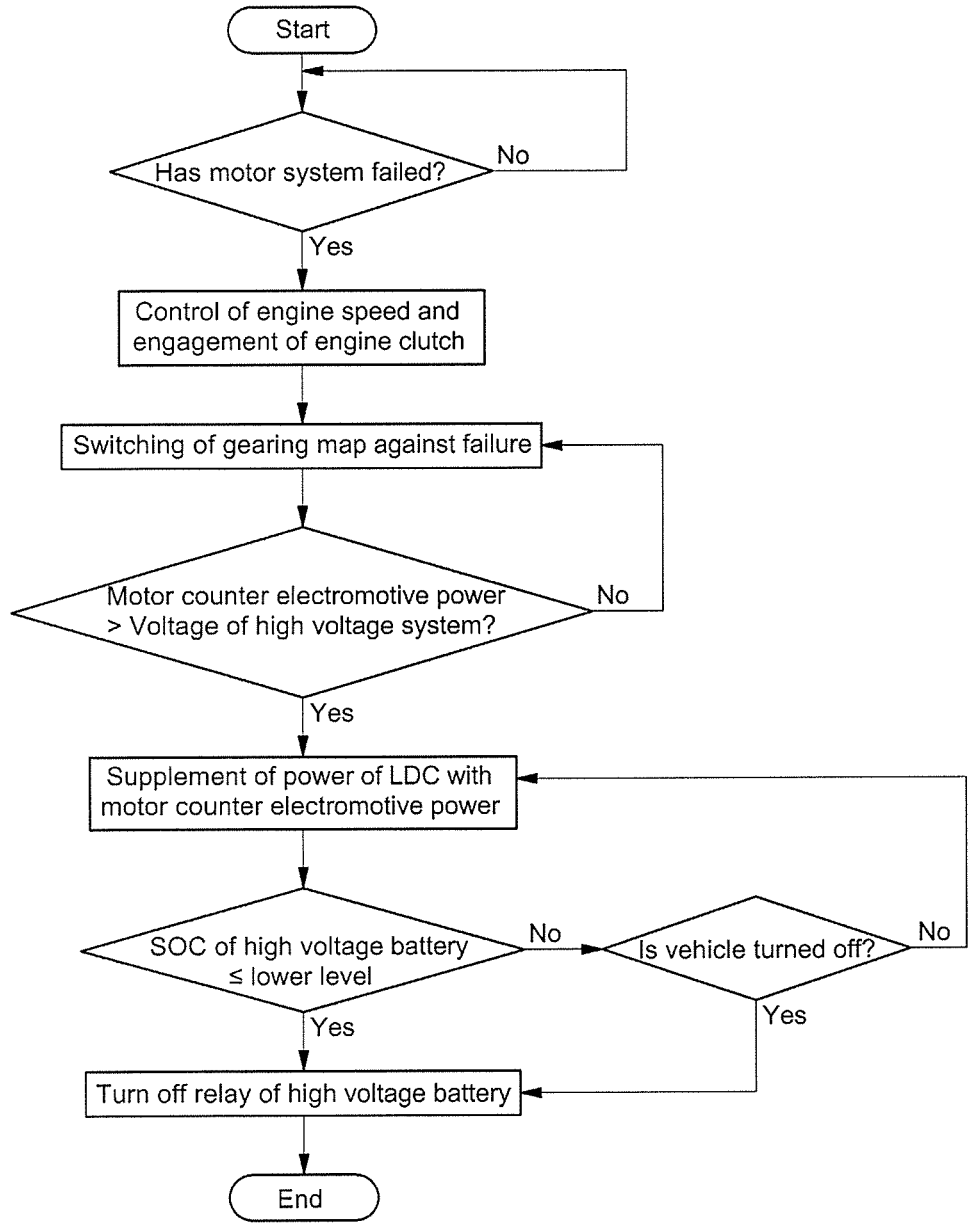

[FIG.3]
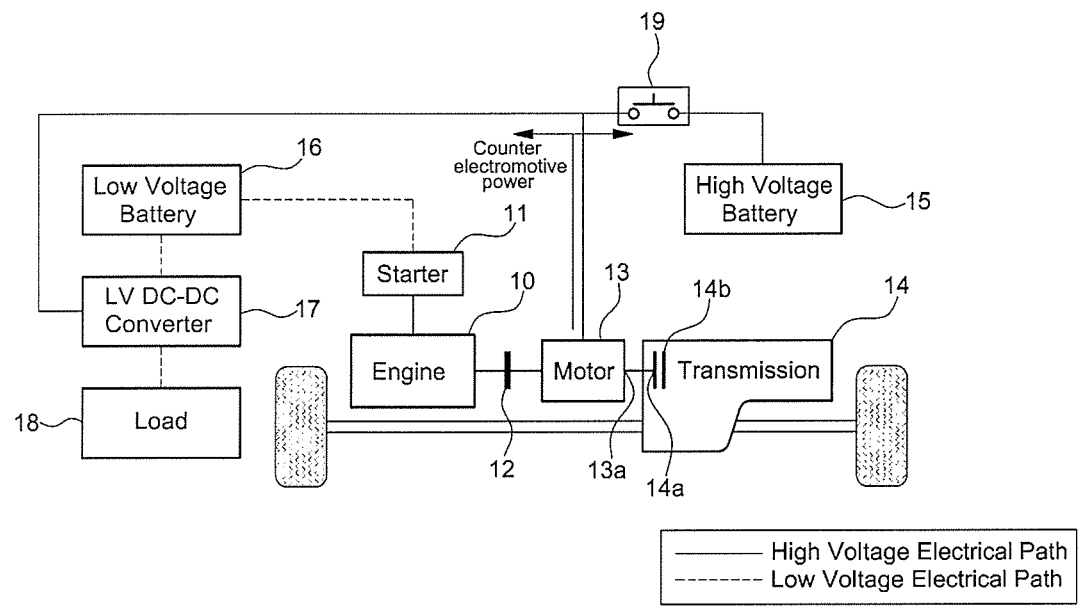

FAIL-SAFE METHOD FOR PARALLEL HYBRID ELECTRIC VEHICLE

CROSS REFERENCE TO RELATED APPLICATION(S)

This application claims the benefit of Korean Patent Application No. 10-2017-0182620, filed on Dec. 28, 2017, which is hereby incorporated by reference in its entirety into this application.

TECHNICAL FIELD

The present disclosure relates generally to a fail-safe method for parallel hybrid electric vehicles, and more particularly, to a fail-safe method for parallel hybrid electric vehicles capable of securing fail-safe measures in preparation for a failure of a motor system that generates driving power.

BACKGROUND

Generally, a hybrid electric vehicle is a vehicle that uses two or more types of driving sources, such as an internal engine system and an electric motor, and various kinds of power transmission systems including the internal engine system and the electric motor.

A representative power transmission system of the hybrid electric vehicle includes a parallel type system and a serial type system. The serial type system is configured such that the internal engine system and the electric motor are serially coupled. Thus, although the serial type system has advantageously relatively simple structure and control logic to those of the parallel type system, it is disadvantageous in terms of energy conversion efficiency, since mechanical energy from the engine system is stored in a battery module in the form of electric power, which is then used to activate the electric motor to drive the vehicle. Conversely, although the parallel type system has disadvantageously relatively complex structure and control logic to those of the serial type system, it is advantageous in terms of energy efficiency, since it can use the mechanical energy from the internal engine system and the electric energy from the battery module at the same time.

A conventional parallel type hybrid electric vehicle system uses a high voltage start generator (HSG) or a low voltage starter as an engine starter. The system employing the low voltage starter as an engine starter is advantageous in terms of packaging of an engine room and saving for system cost, but disadvantageous in securing driving safety in preparation for a failure of a motor system generating driving power, compared to the HSG employed system.

This is because a high voltage battery unit generating high voltage in the battery module of the parallel type system using the low voltage starter is charged during driving of the hybrid vehicle system by an electric motor which is only a high voltage type component in the parallel type system. Thus, when a motor system fails, the only method of charging the high voltage battery unit during driving of the hybrid vehicle is lost. In this case, the high voltage battery unit is discharged while supplying electric power to a low voltage DC-DC converter (LDC), resulting in an over-discharged state.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a fail-safe method for a parallel hybrid electric vehicle, in which method, when a motor system generating driving power fails, an operation thereof changes to a limp home mode, which corresponds to a fail-safe mode of a vehicle, so as to generate a counter electromotive power of the motor using engine power, thereby minimizing discharge of and preventing over-discharge of a high voltage battery unit (first battery unit) used as a power source of the motor and thus securing driving safety.

In order to achieve the above object, according to one aspect of the present disclosure, a fail-safe method for a parallel hybrid electric vehicle, which includes a motor connected between an engine and a transmission, and an engine clutch connected between the engine and the motor, includes: when a motor system failure to disable the operation of the motor occurs in a condition in which the vehicle is able to run using power from the motor after starting of the vehicle, operating, by a controller, the engine using a starter and engaging the engine clutch; switching, by the controller, a first gearing map, which changes a gear ratio of the transmission depending on a throttle vale opening rate regulated by an accelerator pedal and a vehicle speed obtained accordingly, to a second gearing map, which allows the gear ratio to change at a higher vehicle speed than that before the motor system failure occurs; and assisting, by the controller, a driving power of a first battery consumed by a low voltage DC-DC converter (LDC) with a counter electromotive power of the motor generated during operating of the engine in an engaged state of the engine clutch.

The starter may be an engine starter driven with power from a second battery to be charged by the LDC.

In the fail-safe method, when a rotational speed of an input shaft of the transmission connected to the motor is lower than an idling speed of the engine in the engaged state of the engine clutch, an input clutch connected to the input shaft of the transmission is controlled to slip out of the input shaft to prevent an engine stall.

When the rotational speed of the input shaft of the transmission is lower than the idling speed of the engine, if the input clutch of the transmission is not able to be controlled to slip out of the input shaft, the engine clutch is controlled to have a slipping mode to prevent the engine stall.

The fail-safe method may further include a step of, when a vehicle stops into an idling mode of the engine during driving of the vehicle using the driving power from the engine, generating the counter electromotive power of the motor using a driving power from the engine by engaging the engine clutch and releasing an engaged state of the input clutch of the transmission connected to an output shaft of the motor.

The fail-safe method may further include a step of, if a state of charge of the high voltage battery is equal to or lower than a lower discharge level, blocking the discharge of the high voltage battery by turning off a relay for controlling the discharge of the high voltage battery.

According to the fail-safe method for a parallel hybrid electric vehicle of the present disclosure, when a parallel hybrid system employing a low voltage starter fails at a motor system thereof (e.g. a failure in a motor or an inverter for controlling the motor), discharge and over-discharge of the high voltage battery are minimized and prevented, thereby preventing a driving-disabled state of a vehicle due to the over-discharge of the high voltage battery and thus ensuring driving safety.

BRIEF DESCRIPTION OF THE DRAWINGS

The above and other objects, features and advantages of the present disclosure will be more clearly understood from the following detailed description when taken in conjunction with the accompanying drawings, in which:

FIG. 1 is an exemplary systematic block diagram of a parallel hybrid system to which a fail-safe method for a parallel hybrid electric vehicle is applied according to an exemplary embodiment of the present disclosure;

FIG. 2 is a flow chart illustrating the fail-safe method for a parallel hybrid electric vehicle according an exemplary embodiment of to the present disclosure; and FIG. 3 is a systematic block diagram of the parallel hybrid system in which a lower voltage DC-DC converter (LDC) is being assistantly supplied with electric power using a counter electromotive power generated with the fail-safe method according another exemplary embodiment of to the present disclosure.

DETAILED DESCRIPTION

Hereinbelow, exemplary embodiments of the present disclosure will be described in detail with reference to the accompanying drawings. In the following description, however, it is to be noted that the description of functions or configurations of conventional elements will be omitted to prevent making the gist of the present disclosure unclear.

First, a system structure of a parallel hybrid electric vehicle will be described in brief with reference to FIG. 1.

As illustrated in FIG. 1, the parallel hybrid electric vehicle has a motor 13 installed between an engine 10 and a transmission 14, and an engine clutch 12 installed between the engine 10 and the motor 13. The engine clutch 12 serves to control power connection between the engine 10 and the motor 13, so that the engine clutch selectively power-connects the engine 10 and the motor 13 to obtain selective power-transmission therebetween. A high voltage battery 15, which can be charged by the motor 13, is connected to the motor 13, and a low voltage starter 11 is installed onto the engine 10 as an engine starter.

In the parallel hybrid electric vehicle, a low voltage battery 16 is connected to the low voltage starter 11 to supply power thereto, and a low voltage DC-DC converter (LDC) 17 is connected to the low voltage battery 16 and the high voltage battery 15 to receive the power from the low voltage battery 16 and the high voltage battery 15.

The LDC 17 serves both to charge the low voltage battery 16, along with converting the power from the high voltage battery 15, and to supply a driving power to an electrical load 18 of a vehicle using the power from at least one of the high voltage battery 15 and the low voltage battery 16. Further the LDC 17 is connected to the motor 13 for power supply thereto.

Here, the low voltage battery 16 and the high voltage battery 15 are batteries provided in the parallel hybrid system, wherein the high voltage battery 15 outputs a higher voltage power than that of the low voltage battery 16, and the motor 13 is driven with the high voltage power from the high voltage battery 15.

The parallel hybrid electric vehicle includes a first power system (also referred to as a high voltage system), in which components, which are connected together with a solid line in FIG. 1, supply or consume relatively high voltage power, and a second power system (also referred to as a low voltage system), in which components, which are connected together with a dotted line in FIG. 1, supply or consume relatively low voltage power, wherein the high voltage battery 15 for power supply in the first power system may be referred to as a first battery, and the low voltage battery 16 for power supply in the second power system may be referred to as a second battery.

The vehicle having a parallel hybrid system is advantageous in terms of packaging of an engine room and reducing system cost, owing to the provision of the low voltage starter 11, as an engine starter, driven with the power from the low voltage battery 16. However, the vehicle equipped with the parallel hybrid system is disadvantageous in securing the driving safety in preparation for a motor failure occurring after starting and an operable mode (specifically, in a condition in which a vehicle is operable only with power from the motor after starting of a vehicle, compared to a conventional system employing a high voltage start generator (HSG) as an engine starter).

This is because the high voltage battery 15 generating a relatively high voltage power in the battery module of the parallel type system using the low voltage starter 11 is charged during driving of the hybrid vehicle by the motor 13 that is only a component of the high voltage power system. That is, if a motor system fails, the only method of charging the high voltage battery 15 during driving of the hybrid vehicle is lost. In this case, the high voltage battery 15 is discharged while supplying electric power to the LDC 17, resulting in an over-discharged state.

Thus, in case of the vehicle employing the parallel hybrid system using the low voltage starter 11, if a motor failure (e.g. a failure in the motor or an inverter for controlling the motor) which disables the motor 13 to operate occurs in a condition in which the vehicle is operable only with the motor power after starting (e.g. in a low-speed driving state), the vehicle may not be driven.

However, according to the present disclosure, when the motor system failure which disables the motor 13 to operate occurs in a condition in which the vehicle is operable with the motor power after starting occurs, in order to prevent driving-disabled state due to the motor system failure and secure driving safety, an operation mode is switched to a limp home mode, which corresponds to a fail-safe mode of a vehicle, to generate a counter electromotive power of the motor 13, which is assistantly supplied to the LDC 17, thereby minimizing discharge of and preventing over-discharge of the high voltage battery 15. This prevents driving-disabled state of the vehicle due to the over-discharge of the high voltage battery 15 and enables the vehicle to be driven, thereby contributing to safety of the vehicle and passengers therein.

Here, in the parallel hybrid system shown in FIG. 1, if the motor system failure which disables the motor to operate occurs, a controller (not shown) equipped in a vehicle employing the parallel hybrid system detects and analyzes the failure in real time, and switches a vehicle driving mode to the limp home mode so as to perform a control operation as follows.

For example, when the motor system fails, the controller receives a signal to turn off a relay 19 of the high voltage battery 15, wherein the relay 19 is installed between the high voltage battery 15 and the LDC 17 to control discharging and charging of the high voltage battery 15.

FIG. 2 is a flow chart illustrating the fail-safe method for a parallel hybrid electric vehicle according to the present disclosure, and FIG. 3 is a systematic block diagram of the parallel hybrid system in which the LDC 17 is being assistantly supplied with electric power using a counter electromotive power generated with the fail-safe method according to the present disclosure.

As illustrated in FIG. 2, the controller monitors and detects whether a motor system for generating driving power in the parallel hybrid system fails or not. The motor system includes the motor 13 for generating driving power of a vehicle, and an inverter and the like for controlling the motor 13.

When the motor 13 comes to a driving-disabled state due to the motor system failure in a condition in which a vehicle is operable only with the power from the motor 13 after starting, the engine 10, which is not yet driven, is driven using the low voltage starter 11, and the engine is then speed-controlled such that the engine clutch 12 is engaged with the engine 10 and the motor 13 to transmit power therebetween.

Thus, the vehicle can be driven with the driving power from the engine 10, and the counter electromotive power of the motor 13 can be generated by rotating the motor 13 using the rotary power from the engine 10 at the same time. The counter electromotive power generated from the motor 13 is supplied to the LDC 17 and the high voltage battery 15, thereby assisting the power of the high voltage battery 15, which is consumed by the LDC 17.

The vehicle employing the parallel hybrid system is generally driving in a released mode of the engine clutch 12 in a condition in which the vehicle can be driven only with the motor power. However, if the motor system fails, the engine clutch 12 is controlled to come to an engaged mode so as to generate the counter electromotive power of the motor 13 using the engine power.

Since the engine clutch 12 can be engaged at an engine speed equal to or lower than a preset speed, when the motor system failure which disables the motor 13 to operate occurs, the engine speed is controlled to have a speed that enables the engine clutch 12 to be engaged.

When a rotary speed of an input shaft 14a of the transmission is lower than an idling speed of the engine 10 during engaging of the engine clutch 12, a stall of the engine 10 may occur. Thus, when the rotary speed of the input shaft 14a of the transmission is lower than the idling speed of the engine, an input clutch 14b of the transmission is controlled to have a slipping mode, thereby preventing the engine stall (stopping operation of the engine).

The idling speed means a revolutions per minute (RPM) of the engine 10 at an idling mode, i.e. a rotary speed at which the engine 10 rotates without a load in a state in which an acceleration pedal is not stepped on. Further, the input clutch 14a of the transmission releases the power connection between the motor 13 and the transmission 14 when in a slipping mode, so as to block the power from the engine 10 from being transmitted to vehicle wheels via the transmission 14.

Specifically, as illustrated in FIG. 1, the transmission 14 is connected to the motor 13 such that power is able to be transmitted between the input shaft 14a and the output shaft 13a of the motor 13, wherein the input clutch 14b provided in the transmission 14 is connected to the input shaft 14a of the transmission so that power input through the input shaft 14a is transmitted to an axle via the input clutch 14b and the output shaft of the transmission connected to the input clutch 14b.

Thus, when the input clutch 14b of the transmission is controlled to have a slipping mode, a load of the input clutch 14b does not substantially affect the input shaft 14a of the transmission, thereby preventing the engine stall. That is, when the input clutch 14b, which is connected to an output end of the engine 10, is controlled to have the slipping mode (or released mode) in which power transmission is not performed, the engine speed is not affected by the rotary speed of the input shaft 14a of the transmission, thereby preventing the engine stall due to the rotary speed of the input shaft 14a of the transmission.

However, there may be a case in which the slipping mode of the input clutch 14b cannot be obtained according to features of the transmission 14. In this case, the engine clutch 12 is controlled to have the slipping mode so as to prevent the engine stall due to the load of the input shaft 14a of the transmission. That is, when the rotary speed of the input shaft 14a of the transmission is lower than the idling speed of the engine 10, if the slipping mode of the input clutch 14b cannot be obtained, the engine clutch 12 is controlled to have the slipping mode so as to prevent a stall of the engine 10. Here, the engine clutch 12 is controlled to maintain the slipping mode until the rotary speed of the input shaft 14a reaches the idling speed of the engine 10 or more.

When a vehicle comes to a stop into an engine idling mode during driving using driving power from the engine 10, for example, when the rotary speed of the input shaft 14a of the transmission becomes zero and the vehicle stops after the engine clutch 12 is controlled to have the slipping mode, the engine clutch 12 is engaged to generate the counter electromotive power of the motor 13 using the driving power from the engine 10, and the engaged input clutch 14b of the transmission is disengaged to maintain a neutral state of the input clutch 14b.

In the parallel hybrid system, when the power of the engine 10 is transmitted to the vehicle wheels via the transmission 14, or when the motor 13 is rotated with the power from the engine 10, the motor 13 is rotated with the engine power to generate the counter electromotive power. Further, the counter electromotive power of the motor 13 is supplied to the LDC 17 and the high voltage battery 15, so that the power of the high voltage battery 15, which is consumed by the LDC 17 supplying power to the low voltage power system, can be assisted (see FIG. 3). For example, the LDC 17 supplies power to the electrical load 18 consuming the low voltage power and the low voltage battery 16 charged with the low voltage power in the low voltage power system.

As illustrated in FIG. 3, when the counter electromotive power of the motor 13 is supplied to the LDC 17 and the high voltage battery 15 to assist the power that the LDC 17 consumes while supplying the power to the low voltage power system in the parallel hybrid system, i.e. when the power of the high voltage battery 15, which is consumed by the LDC 17, is assisted with the counter electromotive power of the motor 13, discharge of the high voltage battery 15 is minimized so as to prevent driving disabled state of a vehicle occurring due to over-discharge of the high voltage battery 15. This is because the LDC 17 serves to convert the high voltage power of the high voltage battery 15 to the low voltage power and supply the low voltage power to low voltage power system including the electrical load 18 and the low voltage battery 16.

Thus, with a supply of the counter electromotive power of the motor 13 generated in an engaged state of the engine clutch 12 to the LDC 17 and the high voltage battery 15, the power of the high voltage battery 15, which is consumed by the LDC 17, is assisted, and discharge of the high voltage battery 15 can thus be reduced.

Here, when the counter electromotive voltage of the motor 13 is lower than the output voltages of the LDC 17 and the high voltage battery 15, the counter electromotive power of the motor 13 cannot assist the power of the LDC 17. The electromotive voltage of the motor 13 depends on the rpm of the motor 13.

Thus, in order to assist the power consumed by the LDC 17 using the counter electromotive voltage of the motor 13, it is required to use revolutions per unit time of the engine 10 after the motor system failure (engine rpm after the failure) that is higher than revolutions per unit time of the engine 10 before the motor system failure (engine rpm before the failure).

Since the parallel hybrid system uses the transmission 14 employing a preset gear ratio (shifting ratio) according to an opening rate (%) of an accelerator pedal for controlling a rotary speed of the engine 10 and a vehicle speed (km/h), in order to maintain a relatively high rotary speed of the engine 10 during driving or stopping in an idling mode, it is required to use different gearing maps for a driving state with the motor system failure and a normal driving state without the motor system failure, respectively.

That is, the transmission 14 is a transmission having a gear ratio that is determined according to a preset gearing map, which is adopted to change or determine the gear ratio depending on the vehicle speed and opening rate (stepped-on degree) of an accelerator pedal. Thus, with the configuration in which different gearing maps are used for the driving state without the motor system failure and the driving state with the motor system failure, respectively, so that, in case of the motor system failure, the gear ratio is changed at a higher vehicle speed, the rotary speed of the engine can be maintained to have a higher rotary speed based on a real time vehicle speed.

Thus, when a motor system failure occurs in the parallel hybrid system, the gearing map of the transmission 14 is switched to a gearing map for a limp home mode from a reference gearing map. Here, the reference gearing map means a gearing map that determines a gear ratio of the transmission 14 during a normal driving before the motor system failure occurs, and the gearing map for a limp home mode (or gearing map against failure) means a gearing map that determines a gear ratio of the transmission 14 after the motor system failure occurs.

The gearing map for a limp home mode is configured such that up-shift and down-shift of a gear ratio occurring depending on the vehicle speed and the opening rate of the accelerator pedal occur at a higher vehicle speed than that of the reference gearing map. This enables revolutions per unit time (rotary speed) of the engine 10 to be higher than before the motor system failure occurs.

Thus, when the motor system failure occurs, the gearing map of the transmission 14 is switched to the gearing map for a limp home mode from the reference gearing map, so that the rpm of the engine after the motor system failure occurs can be maintained to be higher than before the motor system failure occurs.

Since the rpm of the motor also increases when the rpm of the engine is maintained to be higher in an engaged state of the engine clutch 12, the rpm of the motor can also be maintained to be higher as the rpm of the engine maintains higher rpm according to the switching of the gearing map.

Since a higher counter electromotive voltage of the motor is generated with high speed rotation of the engine and the motor, the counter electromotive voltage of the motor has a higher voltage than the output voltages of the LDC 17 and the high voltage battery 15, thereby assisting the power consumed by the LDC 17.

Since although the power in the low voltage power system can be assisted based on the counter electromotive power of the motor 13 forming a high voltage, it is difficult to completely prevent discharge of the high voltage battery 15, there may be a risk of over-discharge of the high voltage battery 15.

Thus, it is preferred to prevent over-discharge of the high voltage battery 15 through monitoring the state of charge (SOC) of the high voltage battery 15 while performing the control operation for maintaining the state of assisting the power supplied to the LDC until a vehicle stops at a safe location.

To this end, the SOC of the high voltage battery 15 is monitored while the power of the LDC is assisted and the SOC of the high voltage battery 15 is compared with a preset lower discharge level, until a vehicle is turned off.

As a result of comparison, when the SOC of the high voltage battery 15 decreases to a value equal to or lower than the lower discharge level, the relay 19 for controlling the discharge of the high voltage battery 15 is turned off to block the discharge of the high voltage battery 15, and when the SOC of the high voltage battery 15 exceeds the lower discharge level, the relay 19 is selectively turned off according to whether the vehicle is turned off or not. As illustrated in FIG. 1, the relay 19 is installed between the LDC 17 and the high voltage battery 15, and can block the power of the high voltage battery 15 from being supplied to the LDC 17.

Specifically, when the SOC of the high voltage battery 15 exceeds the lower discharge level and the vehicle is in a turned-on state, the SOC of the high voltage battery 15 is monitored while the control operation to assist the power of the LDC using the counter electromotive power of the motor 13 is performed, and when the SOC of the high voltage battery 15 exceeds the lower discharge level and the vehicle is in a turned-off state, the relay 19 is controlled to be turned off to block over-discharge of the high voltage battery 15.

Here, the lower discharge level means a lower value of the SOC that is able to prevent the over-discharge of the high voltage battery 15 and to maintain a normal state of the high voltage battery 15.

According to the present disclosure, in order to maintain a higher engine rpm before the motor system failure occurs in a condition in which a vehicle is able to be driven only with the motor power after starting in the parallel hybrid system having the transmission 14 employing a fixed gear ratio, the gearing map determining a gear ratio of the transmission 14 is switched to the gearing map for a limp home mode so that up-shift of the gear change occurs at a higher vehicle speed than the condition (situation) before the motor system failure occurs.

Here, various gearing maps for a limp home mode are different from the reference gearing map such that gearshifts occur at different vehicle speeds from that of the reference gearing map. Such gearing maps for a limp home mode may be stored in the controller of the parallel hybrid vehicle.

According to the respective gearing maps for a limp home mode stored in the controller, gearshifts may occur at different vehicle speeds.

In order to maintain a higher rpm of an engine than the condition before the motor system failure occurs, among the gearing maps for a limp home mode, the gearing map is selected and switched, which has a change time (vehicle speed) of a gear ratio, which is set to maintain an rpm of an engine that allows a counter electromotive voltage of the motor 13 to be higher than output voltages of the LDC 17 and the high voltage battery 15 based on the real time vehicle speed (current vehicle speed) when the motor system failure occurs.

With the configuration in which the gearing map of the transmission 14 for change of a gear ratio is switched from the reference gearing map to a proper gearing map for a limp home mode according to the real time vehicle speed, even when the rpm of the engine increases to a specified level relative to the condition before the motor system failure occurs, the change of the gear ratio does not occur, making it possible to maintaining a higher rpm of the engine than the condition before the motor system failure occurs. Then, the configuration to maintain the rpm of the engine higher than the condition before the motor system failure occurs so that the counter electromotive voltage of the motor 13 is generated to be higher than output voltages of the high voltage battery 15 and the LDC 17 enables the power supplied to the LDC to be assisted with the counter electromotive power of the motor 13.

Although the exemplary embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. A fail-safe method for a parallel hybrid electric vehicle, which includes a motor connected between an engine and a transmission, and an engine clutch connected between the engine and the motor, the method comprising steps of:
    operating, by a controller, the engine using a starter and engaging the engine clutch, when a motor system failure to disable an operation of the motor occurs in a condition in which the vehicle runs using power from the motor after the vehicle starts;
    switching, by the controller, a first gearing map, which determines a change in a gear ratio of the transmission depending on a throttle vale opening rate regulated by an accelerator pedal and a vehicle speed obtained, to a second gearing map, which allows the gear ratio to change at a higher vehicle speed than that before the motor system failure occurs; and
    assisting, by the controller, a driving power of a first battery consumed by a low voltage DC-DC converter (LDC) with a counter electromotive power of the motor generated during operating of the engine in an engaged state of the engine clutch.

2. The fail-safe method according to claim 1, further comprising a step of, before the step of assisting, when the vehicle is in an idling mode of the engine during driving of the vehicle using a driving power from the engine, generating the counter electromotive power of the motor using the driving power from the engine by engaging the engine clutch and releasing an engaged state of an input clutch of the transmission connected to an output shaft of the motor.

3. The fail-safe method according to claim 1, wherein when a rotational speed of an input shaft of the transmission connected to the motor is lower than an idling speed of the engine in the engaged state of the engine clutch, an input clutch connected to the input shaft of the transmission is controlled to slip out of the input shaft to prevent an engine stall.

4. The fail-safe method according to claim 3, wherein when the rotational speed of the input shaft of the transmission is lower than the idling speed of the engine, if the input clutch of the transmission is not able to be controlled to slip out of the input shaft, the engine clutch is controlled to have a slipping mode to prevent the engine stall.

5. The fail-safe method according to claim 1, further comprising a step of, if a state of charge of the first battery is equal to or lower than a lower discharge level, blocking discharge of the first battery by turning off a relay for controlling the discharge of the first battery.

6. The fail-safe method according to claim 1, wherein the starter is an engine starter driven with power from a second battery which is charged by the LDC.

7. The fail-safe method according to claim 1, wherein the first battery supplies the driving power of the first battery to the motor.

8. The fail-safe method according to claim 6, wherein the LDC supplies the driving power of the first battery to an electrical load of the vehicle.

* * * * *